(12) United States Patent
Ohigashi et al.

(10) Patent No.: US 10,554,845 B2
(45) Date of Patent: Feb. 4, 2020

(54) WORK VEHICLE AND METHOD OF CONTROLLING ENGINE OUTPUT

(71) Applicant: KOMATSU LTD., Tokyo (JP)

(72) Inventors: Koji Ohigashi, Hirakata (JP); Kimihiro Mori, Hirakata (JP); Kazuki Kumagai, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 435 days.

(21) Appl. No.: 15/326,680

(22) PCT Filed: Jan. 20, 2016

(86) PCT No.: PCT/JP2016/051538
§ 371 (c)(1),
(2) Date: Jan. 17, 2017

(87) PCT Pub. No.: WO2017/126049
PCT Pub. Date: Jul. 27, 2017

(65) Prior Publication Data
US 2018/0338059 A1 Nov. 22, 2018

(51) Int. Cl.
*F02D 11/10* (2006.01)
*F02D 41/08* (2006.01)
*H04N 1/024* (2006.01)
*B60W 10/11* (2012.01)
*B60W 10/06* (2006.01)

(52) U.S. Cl.
CPC ............ *H04N 1/024* (2013.01); *B60W 10/06* (2013.01); *B60W 10/11* (2013.01); *F02D 11/10* (2013.01); *F02D 41/08* (2013.01)

(58) Field of Classification Search
CPC ...... B60W 10/04; B60W 10/06; B60W 10/08; B60W 10/11; B60W 20/00;
(Continued)

(56) References Cited

U.S. PATENT DOCUMENTS 8,607,919 B2 * 12/2013 Shirao ................ F04B 9/02
180/307
2002/0160880 A1 * 10/2002 Sekii .................. F16H 61/0213
477/143
(Continued)

FOREIGN PATENT DOCUMENTS

JP 2011-012562 A 1/2011
JP 2012-241585 A 12/2012
(Continued)

*Primary Examiner* — John Kwon
*Assistant Examiner* — Johnny H Hoang
(74) *Attorney, Agent, or Firm* — Drinker Biddle & Reath LLP

(57) ABSTRACT

An engine output control unit of a work vehicle is configured to set a target rotation speed of an engine by using an engine output torque curve, to control an output of the engine. The engine output control unit is configured to control the output of the engine so as to set torque to be higher than torque at an actual rotation speed obtained using the engine output torque curve. Typically, when the actual rotation speed of the engine becomes smaller than the target rotation speed, the engine output control unit sets an engine output torque curve that is greater in torque at the actual rotation speed than the engine output torque curve, and switches control of the output of the engine from control performed using the engine output torque curve to control performed using the engine output torque curve.

10 Claims, 10 Drawing Sheets

(58) Field of Classification Search
CPC ......... B60W 2300/17; B60W 2510/06; B60W 2510/0638; B60W 2520/10; B60W 2710/06; B60W 2710/0644; B60W 30/1884; F02D 11/10; F02D 11/105; F02D 29/00; F02D 29/04; F02D 31/00; F02D 31/008; F02D 41/08; F02D 2041/026; F02D 2041/226
USPC .............................. 701/101, 107, 110, 114
See application file for complete search history.

(56) References Cited

U.S. PATENT DOCUMENTS

| | | | |
|---|---|---|---|
| 2004/0088103 A1* | 5/2004 | Itow | B60K 6/485 701/110 |
| 2004/0222000 A1 | 11/2004 | Ohtsukasa | |
| 2005/0181908 A1 | 8/2005 | Eriksson et al. | |
| 2010/0186713 A1* | 7/2010 | Kawaguchi | B60W 10/06 123/350 |
| 2010/0332102 A1* | 12/2010 | Akiyama | E02F 9/2232 701/99 |
| 2011/0040458 A1* | 2/2011 | Nakagawa | F02D 29/00 701/50 |
| 2014/0200795 A1 | 7/2014 | Kawaguchi et al. | |
| 2014/0214305 A1 | 7/2014 | Eriksson | |

FOREIGN PATENT DOCUMENTS

| | | |
|---|---|---|
| JP | 2015-161306 A | 9/2015 |
| WO | WO-2015/114061 A1 | 8/2015 |

* cited by examiner

WORK VEHICLE AND METHOD OF CONTROLLING ENGINE OUTPUT

TECHNICAL FIELD

The present invention relates to a work vehicle and a method of controlling an engine output.

BACKGROUND ART

Work vehicles such as a hydraulic excavator are required to achieve both of low fuel consumption and improved workability.

For example, Japanese Patent Laying-Open No. 2012-241585 (PTD 1) discloses an example of a work vehicle capable of achieving both of low fuel consumption and improved workability as described above. Specifically, this PTD discloses an engine controlling apparatus including: detection unit; no-load maximum rotation speed calculation means; target matching rotation speed calculation means; engine target output calculation means; and engine control means.

The detection means detects the operation state of the work machine. Based on the operation state, the no-load maximum rotation speed calculation means calculates the no-load maximum rotation speed corresponding to the rotation speed of the engine that is increased to the maximum level when the load for the work machine is released. Based on the operation state, the target matching rotation speed calculation means calculates, separately from the no-load maximum rotation speed, the target matching rotation speed corresponding to the rotation speed of the engine that is increased when a load is applied to the work machine. Based on the operation state, the engine target output calculation means calculates an engine target output that can be output to the utmost extent. The engine control means controls the engine rotation speed to fall within a range between the no-load maximum rotation speed and the target matching rotation speed in the state where the engine target output is limited.

CITATION LIST

Patent Document

PTD 1: Japanese Patent Laying-Open No, 2012-241585

SUMMARY OF INVENTION

Technical Problem

When paying attention to one engine output torque curve among a plurality of engine output torque curves used for a work vehicle, the line connecting the maximum torque point and the maximum horsepower point is less inclined if the torque at the maximum horsepower point (rated point) is set to be relatively high in order to increase the maximum horsepower.

Accordingly, when the engine rotation speed becomes smaller than the rotation speed of the target matching point (which will be hereinafter also referred to as a "target rotation speed") due to a load caused by work, the force acting to reset the engine rotation speed back to the target rotation speed is weaker than that in the case where the above-described line is more inclined.

Accordingly, when the above-described line is less inclined, it becomes difficult to suppress reduction of the engine rotation speed as compared with the case where the above-described line is more inclined. Consequently, when the above-described line is less inclined, the engine rotation speed is more likely to decrease as compared with the case where the above-described line is more inclined.

The present invention has been made in light of the above-described problems. An object of the present invention is to provide a work vehicle and a method of controlling an engine output, by which it becomes possible to reduce the possibility of decreasing the engine rotation speed even when the maximum horsepower is set to be increased.

Solution to Problem

According to an aspect of the present invention, a work vehicle includes: an engine; an engine output control unit configured to set a target rotation speed of the engine by using a first engine output torque curve, to control an output of the engine; and a rotation speed detection unit configured to detect an actual rotation speed of the engine. The engine output control unit is configured to control the output of the engine so as to set torque to be higher than torque at the actual rotation speed obtained using the first engine output torque curve.

According to the above-described configuration, it becomes possible to temporarily output torque greater than the torque defined by the first engine output torque curve. Thus, the force acting to reset the engine rotation speed back to a target rotation speed becomes greater than that in the case where the first engine output torque curve is used. Therefore, according to the work vehicle, it becomes possible to reduce the possibility that the engine rotation speed decreases even when the maximum horsepower is set to be increased.

Preferably, the engine output control unit is configured to, when the actual rotation speed of the engine detected by the rotation speed detection unit becomes lower than the target rotation speed, set a second engine output torque curve that is greater in torque at the actual rotation speed than the first engine output torque curve, and switch control of the output of the engine from control performed using the first engine output torque curve to control performed using the second engine output torque curve.

According to the above-described configuration, when the engine rotation speed becomes lower than the target rotation speed, the second engine output torque curve is used. Accordingly, it becomes possible to temporarily output torque greater than the torque defined by the first engine output torque curve.

Preferably, the engine output control unit is configured to set the second engine output torque curve on condition that the actual rotation speed becomes lower than the target rotation speed.

According to the above-described configuration, even if the actual rotation speed of the engine becomes lower than the target rotation speed, the rotation speed of the engine can be prevented from being significantly decreased.

Preferably, the engine output control unit is configured to predict based on the actual rotation speed whether a rotation speed of the engine becomes lower than the target rotation speed or not. The engine output control unit is configured to set the second engine output torque curve on condition that it is predicted that the rotation speed of the engine becomes lower than the target rotation speed.

According to the above-described configuration, it becomes possible to temporarily output torque greater than the torque defined by the first engine output torque curve before the engine rotation speed becomes lower than the target rotation speed. Accordingly, the engine rotation speed can be prevented from becoming lower than the target rotation speed.

Preferably, the work vehicle further includes: a work implement; a hydraulic actuator configured to drive the work implement; and a hydraulic pump configured to supply hydraulic oil to the hydraulic actuator by driving the engine. The engine output control unit is configured to set, as the target rotation speed, a rotation speed of the engine at an intersection point of the first engine output torque curve and a pump absorption torque characteristic line of the hydraulic pump, and, based on an equivalent horsepower curve passing through the intersection point, set an engine output torque curve passing through a point on the equivalent horsepower curve at the actual rotation speed as the second engine output torque curve.

According to the above-described configuration, it becomes possible to achieve the same horsepower as the horsepower at the intersection point of the first engine output torque curve and the pump absorption torque characteristic line of the hydraulic pump.

Preferably, the engine output control unit is configured to set the actual rotation speed close to the target rotation speed using the equivalent horsepower curve.

According to the above-described configuration, when the rotation speed and the torque of the engine come close to the above-described intersection point, the equivalent horsepower relation is maintained between the rotation speed and the torque. Consequently, the workability is excellent as compared with the case where the rotation speed and the torque of the engine come close to the above-described intersection point without maintaining the equivalent horsepower state.

Preferably, the work vehicle further includes a load specifying unit for specifying a load of work performed by the work vehicle. The engine output control unit is configured to, when the load specified is a first load, and when the actual rotation speed is higher than the target rotation speed, control the output of the engine such that the actual rotation speed and the torque at the actual rotation speed change on the equivalent horsepower curve passing through the intersection point.

According to the above-described configuration, when the work with the first load is performed, the equivalent horsepower curve passing through the intersection point can be used. In this case, the horsepower at the intersection point of the equivalent horsepower curve and a droop line of the first engine output torque curve (a line connecting the point of the maximum rotation speed of the engine and the maximum horsepower point) is less than the maximum horsepower point of the first engine output torque curve. Accordingly, the fuel consumption can be reduced as compared with the case where the maximum horsepower point is used.

Preferably, the engine output control unit is configured to, when the load specified is a second load greater than the first load, and when the actual rotation speed is higher than the target rotation speed, control the output of the engine such that the actual rotation speed and the torque change on the first engine output torque curve.

According to the above-described configuration, when the work with the second load greater in load than the work with the first load is performed, the maximum horsepower point on the first engine output torque curve can be used. Therefore, the workability can be improved.

Preferably, the work vehicle further includes a control lever. The load specifying unit is configured to specify the load for the work as the first load when the control lever accepts a first operation, and to specify the load for the work as the second load when the control lever accepts a second operation.

According to the above-described configuration, the work vehicle can specify the load for the work as one of the first load and the second load depending on whether the control lever has accepted the first operation or the second operation.

Preferably, the load specifying unit is configured to specify the load for the work as the first load when a hydraulic pressure of the hydraulic oil is a first value, and to specify the load for the work as the second load when the hydraulic pressure of the hydraulic oil is a second value greater than the first value.

According to the above-described configuration, the work vehicle can specify the load for the work as one of the first load and the second load based on the value of the hydraulic pressure of the hydraulic oil.

According to another aspect of the present invention, a method of controlling an engine output is performed in a work vehicle including an engine. The method of controlling an engine output includes: detecting an actual rotation speed of the engine; and setting a target rotation speed of the engine by using a predetermined engine output torque curve, to control an output of the engine. Controlling an output of the engine includes controlling the output of the engine so as to set torque to be higher than torque at the actual rotation speed obtained using the predetermined engine output torque curve.

According to the above-described method, it becomes possible to temporarily output torque larger than the torque defined by the predetermined engine output torque curve. Thus, the force acting to reset the rotation speed of the engine back to a target rotation speed becomes greater than that in the case where the first engine output torque curve is used. Therefore, according to the method of controlling an engine output, it becomes possible to reduce the possibility that the engine rotation speed decreases even if the maximum horsepower is set to be increased.

Advantageous Effects of Invention

According to the above-described invention, even if the maximum horsepower is set to be increased, it becomes possible to reduce the possibility that the engine rotation speed decreases.

DESCRIPTION OF EMBODIMENTS

Figure 1:
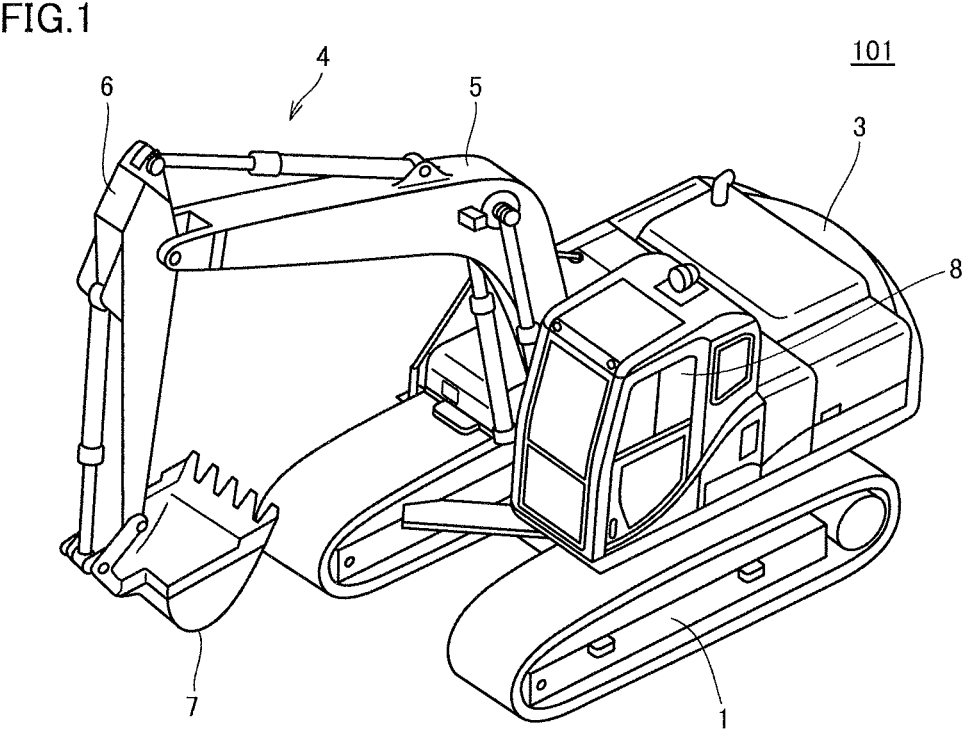
FIG. 1 is a diagram illustrating an external appearance of a work vehicle.

A work vehicle according to each embodiment will be hereinafter described.

In the following description, the same components are designated by the same reference characters. Names and functions thereof are also the same. Accordingly, the detailed description thereof will not be repeated.

<A. Entire Configuration>

FIG. 1 is a diagram illustrating an external appearance of a work vehicle 101 according to an embodiment. As shown in FIG. 1, a hydraulic excavator will be mainly described as an example of work vehicle 101 in the present example.

Work vehicle 101 mainly includes a traveling unit 1, a revolving unit 3, and a work implement 4. The main body of the work vehicle is formed of traveling unit 1 and revolving unit 3. Traveling unit 1 includes a pair of crawler belts on the right and left sides. Revolving unit 3 is mounted so as to be revolvable via a revolving mechanism in an upper portion of traveling unit 1.

Work implement 4 is pivotally supported on revolving unit 3 so as to be operable in the vertical direction, and configured to perform such work as excavation of soil. Work implement 4 includes a boom 5, an arm 6, and a bucket 7. Boom 5 has a base portion that is movably coupled to revolving unit 3. Arm 6 is movably coupled to an end of boom 5. Bucket 7 is movably coupled to an end of arm 6. Revolving unit 3 also includes an operator's compartment 8 and the like.

<B. Configuration of Operator's Compartment>

Figure 2:
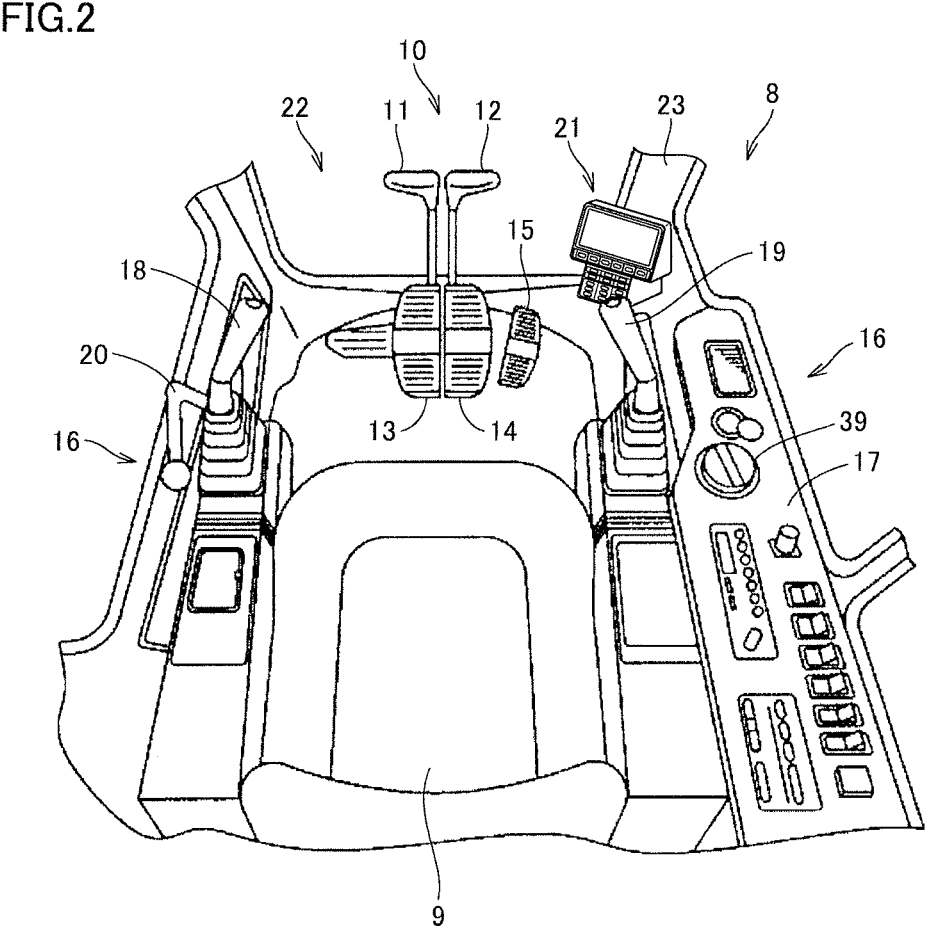
FIG. 2 is a perspective view showing the inner configuration of an operator's compartment.

FIG. 2 is a perspective view showing the inner configuration of operator's compartment 8. As shown in FIG. 2, operator's compartment 8 includes an operator's seat 9, a travel operation unit 10, a pedal for attachment 15, side windows 16 on the right and left sides, a dashboard 17, work implement levers 18, 19, a lock lever 20, a monitor device 21, a front window 22, a vertical frame 23, and a throttle dial 39.

Operator's seat 9 is provided in a central portion of operator's compartment 8. Travel operation unit 10 is provided in front of operator's seat 9.

Travel operation unit 10 includes travel levers 11, 12 and travel pedals 13, 14. Travel pedals 13 and 14 can move together with travel levers 11 and 12, respectively. Traveling unit 1 moves forward when an operator pushes travel levers 11 and 12 forward. Also, traveling unit 1 moves backward when the operator pulls travel levers 11 and 12 backward.

Pedal for attachment 15 is provided in the vicinity of travel operation unit 10. Also, dashboard 17 is provided in the vicinity of side window 16 on the right side in FIG. 2.

Work implement levers 18 and 19 serve as control levers provided on the right and left sides of operator's seat 9. Work implement levers 18, 19 serve to carry out vertical movement of boom 5, pivot of arm 6 and bucket 7, a revolving operation of revolving unit 3, and the like.

Lock lever 20 is provided in the vicinity of work implement lever 18. Lock lever 20 serves to stop such functions as operation of work implement 4, revolution of revolving unit 3, and travel of traveling unit 1. By performing an operation for positioning lock lever 20 in a vertical state (here, an operation for pulling down the lock lever), movement of work implement 4 or the like can be locked (restricted). In the state where movement of work implement 4 or the like is locked by lock lever 20, work implement 4 or the like does not operate even if the operator operates work implement levers 18 and 19. Similarly, even if the operator operates travel levers 11 and 12 and travel pedals 13 and 14, traveling unit 1 does not operate. On the other hand, by performing an operation for positioning lock lever 20 in a horizontal state (here, an operation for pulling up the lock lever), locked (restricted) movement of work implement 4 or the like can be cancelled. This allows work implement 4 or the like to operate.

Monitor device 21 is provided in a lower portion of vertical frame 23 that is a partition between front window 22 and one side window 16 of operator's compartment 8 and it displays an engine state of work vehicle 101, guidance information, warning information, or the like. In addition, monitor device 21 is provided to be able to accept a setting instruction as to various operations of work vehicle 101.

Here, an engine state refers, for example, to a temperature of an engine coolant, a temperature of hydraulic oil, an amount of remaining fuel, and the like. Guidance information includes an indication and the like inviting check and maintenance of the engine of the work vehicle, by way of example. Warning information is information to which operator's attention should be paid.

Throttle dial 39 serves as a fuel adjusting dial. Throttle dial 39 is used for setting the maximum fuel injection quantity. The maximum rotation speed of the engine is determined based on the set value of throttle dial 39. In addition, throttle dial 39 may be of a stepless type or may be configured to have multiple steps of notches, but not particularly limited thereto.

<C. Configuration of Control System>

Figure 3:
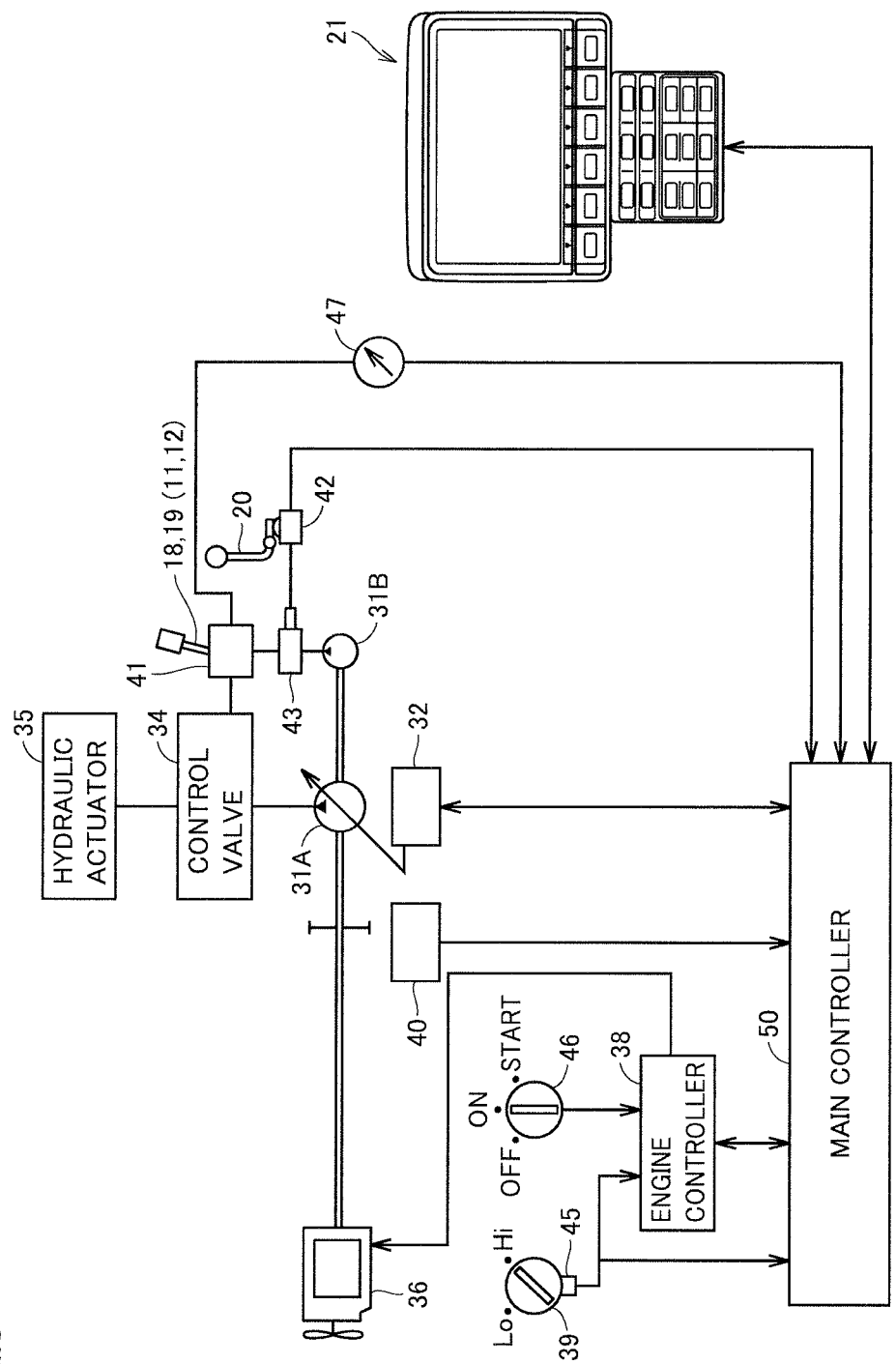
FIG. 3 is a simplified diagram showing the configuration of a control system of the work vehicle.

FIG. 3 is a simplified diagram showing the configuration of a control system in work vehicle 101. As shown in FIG. 3, the control system in work vehicle 101 includes, by way of example, work implement levers 18, 19, travel levers 11, 12, lock lever 20, monitor device 21, a first hydraulic pump 31A, a second hydraulic pump 31B, a swash plate drive apparatus 32, a control valve 34, a hydraulic actuator 35, an engine 36, an engine controller 38, a throttle dial 39, a rotation sensor 40, a work implement lever apparatus 41, a pressure switch 42, a valve 43, a potentiometer 45, a starter switch 46, a pressure sensor 47, and a main controller 50.

First hydraulic pump 31A discharges hydraulic oil used for driving work implement 4 or the like. Second hydraulic pump 31B discharges oil utilized for generating a hydraulic pressure (a pilot pressure) in accordance with operations of work implement levers 18, 19 and travel levers 11, 12. Swash plate drive apparatus 32 is connected to first hydraulic pump 31A.

Swash plate drive apparatus 32 performs a driving operation based on an instruction from main controller 50 and changes an angle of inclination of a swash plate of first hydraulic pump 31A. Hydraulic actuator 35 is connected to first hydraulic pump 31A with control valve 34 interposed therebetween. Hydraulic actuator 35 is a cylinder for boom, a cylinder for arm, a cylinder for bucket, a hydraulic motor for revolution, a hydraulic motor for travel, and the like.

Control valve 34 is connected to work implement lever apparatus 41. Work implement lever apparatus 41 outputs, to control valve 34, a pilot pressure in accordance with a direction of operation and/or an amount of operation of work implement levers 18, 19 and travel levers 11, 12. Control valve 34 controls hydraulic actuator 35 in accordance with the pilot pressure.

Work implement levers 18, 19 and travel levers 12 as well as lock lever 20 are connected to second hydraulic pump 31B.

Pressure sensor 47 is connected to work implement lever apparatus 41. Pressure sensor 47 outputs, to main controller 50, a lever operation signal in accordance with the operation states of work implement levers 18, 19 and travel levers 11, 12.

Main controller 50 carries out such control that first hydraulic pump 31A absorbs best matching torque at each output point of engine 36, in accordance with: the pump absorption torque set according to the operator operation for each of work implement levers 18 and 19; the engine rotation speed set with throttle dial 39 or the like; the actual rotation speed of the engine; and the like.

Engine 36 has a drive shaft connected to first hydraulic pump 31A and second hydraulic pump 31B.

Engine controller 38 controls an operation of engine 36 in accordance with an instruction from main controller 50. Engine 36 is a diesel engine by way of example. The rotation speed of engine 36 is set with throttle dial 39 or the like and the actual engine rotation speed (which is also referred to as an "actual rotation speed") is detected by rotation sensor 40. Rotation sensor 40 is connected to main controller 50.

Throttle dial 39 is provided with potentiometer 45. Potentiometer 45 detects the set value (operation amount) of throttle dial 39. The set value of throttle dial 39 is transmitted to engine controller 38 and main controller 50.

In response to an instruction from main controller 50, engine controller 38 controls an amount of injection of fuel injected by a fuel injector, thereby adjusting the rotation speed of engine 36. Engine controller 38 also adjusts the rotation speed of engine 36 in accordance with a control instruction from main controller 50 to first hydraulic pump 31A.

Starter switch 46 is connected to engine controller 38. As the operator operates starter switch 46 (sets the starter switch to start), a start signal is output to engine controller 38 so that engine 36 starts.

Main controller 50 serves as a controller controlling overall work vehicle 101, and it is configured with a CPU (Central Processing Unit), a non-volatile memory, a timer, and the like. Main controller 50 controls engine controller 38, monitor device 21, and the like. Although main controller 50 and engine controller 38 are separate from each other in the present example, one common controller can also be provided.

Pressure switch 42 is connected to lock lever 20. Pressure switch 42 senses an operation of lock lever 20 when it is operated toward a locking side, and sends a signal to valve (solenoid valve) 43. Since valve 43 thus cuts off supply of oil, such functions as operation of work implement 4, revolution of revolving unit 3, and travel of traveling unit 1 can be stopped. In addition, pressure switch 42 sends a similar signal also to main controller 50.

It is to be noted that work implement 4, engine 36, first hydraulic pump 31A, hydraulic actuator 35, and rotation sensor 40 are examples of a "work implement", an "engine", a "hydraulic pump", a "hydraulic actuator", and a "rotation detection unit", respectively, of the present invention.

<D. Engine Output Control>

(d1. Outline of Control)

Figure 4:
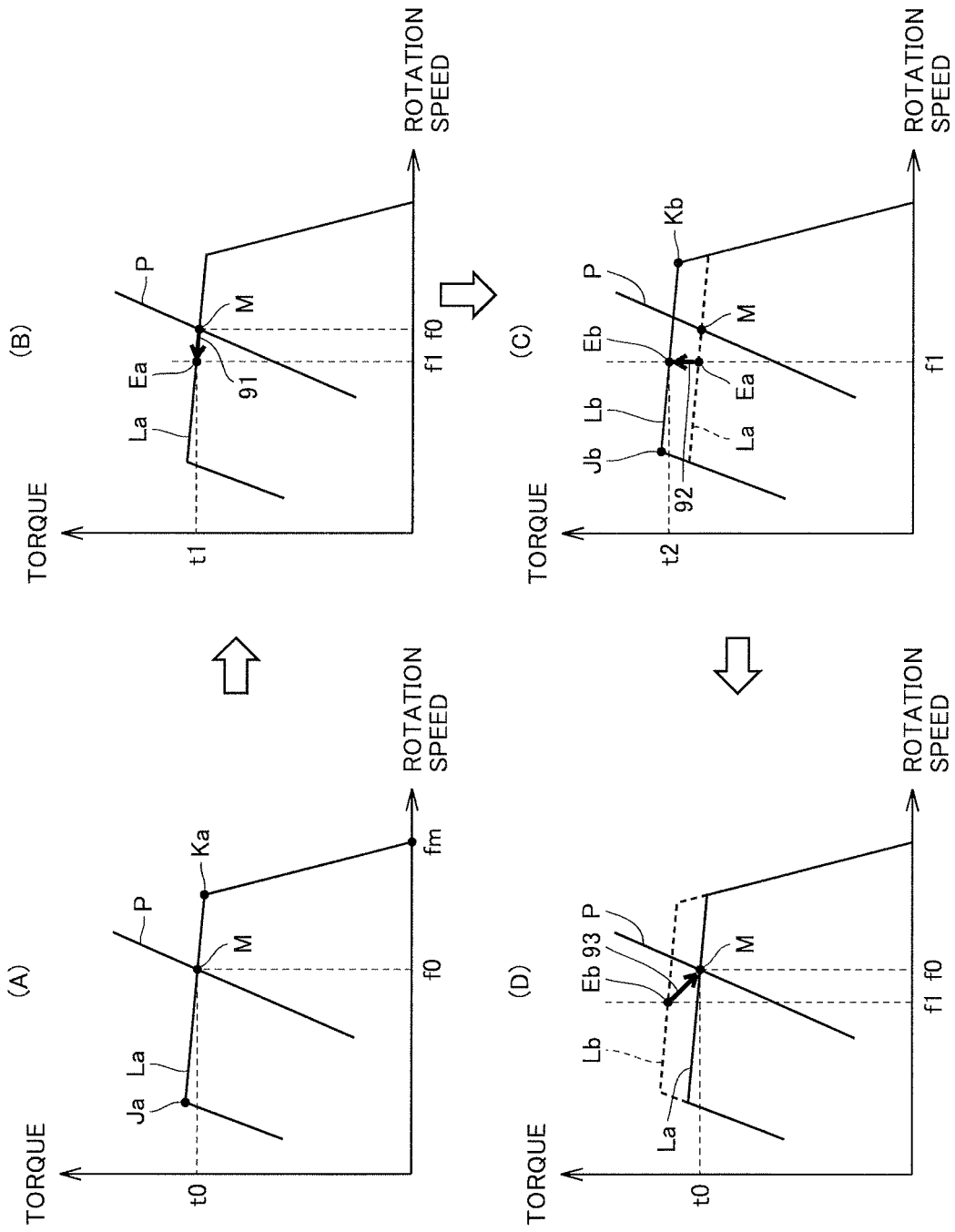
FIG. 4 is a diagram for illustrating an outline of control for an engine output.

FIG. 4 is a diagram for illustrating an outline of control for engine output. Specifically, FIG. 4 is a diagram for illustrating the process performed in main controller 50.

As shown in the state (A) in FIG. 4, main controller 50 (specifically, an engine output control unit 54 (see FIG. 7) described later) sets the target rotation speed of engine 36 by using an engine output torque curve La, to control the output from engine 36. Specifically, main controller 50 performs engine rotation speed sensing control performed using engine output torque curve La and a pump absorption torque characteristic line P. More specifically, main controller 50 performs output control while setting, as a target rotation speed, a rotation speed f0 of the engine at the intersection point of engine output torque curve La and pump absorption torque characteristic line P (which will be hereinafter also referred to as a "target matching point M"), and also setting a torque t0 of the engine at target matching point M as a target torque.

Specifically, main controller 50 is configured such that the output torque of engine 36 and the absorption torque of the hydraulic pump become equal to (are matched with) each other at target matching point M, and that the hydraulic pump (for example, first hydraulic pump 31A) absorbs the maximum horsepower of engine 36 at target matching point M, with the result that a heavy excavation operation can be performed with high efficiency. More specifically, main controller 50 is configured to set the output torque (t0) and the rotation speed (f0) of engine 36 at target matching point M as target values as described above, and increase or decrease the absorption torque of the hydraulic pump while calculating the deviation between target rotation speed f0 and the actual rotation speed of the engine, to thereby cause the output torque of the engine and the absorption torque of the hydraulic pump to be matched with each other at target matching point M. Since such control is an already known technique, the detailed description thereof will not be repeated.

Furthermore, engine output torque curve La has a maximum horsepower point Ka (rated point) and a maximum torque point Ja such that the maximum horsepower is increased. If the torque at maximum horsepower point Ka is set to be relatively high on engine output torque curve La, the straight line connecting maximum torque point Ja and maximum horsepower point Ka is less inclined. Therefore, when the engine rotation speed becomes smaller than target rotation speed f0 due to the load caused by the work, the force acting to reset the engine rotation speed back to target rotation speed f0 (the force spontaneously acting on engine 36) is weaker than that in the case where the above-described straight line is more inclined.

In addition, a rotation speed fm at the intersection point of engine output torque curve La and the horizontal axis that shows the rotation speed represents the rotation speed of the engine that is increased to the maximum level when a load is released (which will be hereinafter also referred to as a "no-load maximum rotation speed fm"). Also in FIG. 4, pump absorption torque characteristic line P is set to be a monotonically increasing function in a prescribed rotation speed range including at least a target matching point.

In the case where a heavy work load occurs in work vehicle 101, when the engine rotation speed (actual rotation speed) decreases to a rotation speed f1 (see an arrow 91) for example as shown in the state (B) in FIG. 4, main controller 50 then sets an engine output torque curve Lb so as to: have a maximum torque point Jb and a maximum horsepower point Kb; and have a torque larger than engine output torque curve La between maximum torque point Jb and maximum horsepower point Kb, as shown in the state (C) in FIG. 4. Specifically, main controller 50 sets engine output torque curve Lb on the condition that the rotation speed of engine 36 detected by rotation sensor 40 becomes lower than target rotation speed f0. More specifically, main controller 50 periodically obtains information about the rotation speed of engine 36. Then, when it is detected that the rotation speed of engine 36 becomes lower than target rotation speed f0, main controller 50 sets engine output torque curve Lb. Also, main controller 50 may be configured to set engine output torque curve Lb on the condition that the rotation speed of engine 36 detected by rotation sensor 40 becomes less than target rotation speed f0 by a threshold value or more.

Based on the condition that engine output torque curve Lb has been set, main controller 50 temporarily switches the output control of engine 36 from the control performed using engine output torque curve La to the control performed using engine output torque curve Lb.

In this case, by the above-described control, a torque higher than torque t1 at an output point Ea can be output at the current rotation speed f1 (see an arrow 92). Specifically, main controller 50 can cause engine 36 to temporarily output torque t2 at an output point Eb at which the rotation speed becomes equal to the rotation speed at output point Ea.

In this way, when the torque that is output at rotation speed f1 increases from torque t1 to torque t2, the force acting to reset the rotation speed of engine 36 back to target rotation speed f0 at target matching point M is larger than that in the case where the torque that is output is not changed from torque t1 (that is, the case where engine output torque curve Lb is not set).

Thereby, even if the rotation speed of engine 36 temporarily decreases, the rotation speed of engine 36 can be reset from rotation speed f1 back to target rotation speed f0.

In addition, when the rotation speed of engine 36 is reset back to target rotation speed f0, main controller 50 returns the output control of engine 36 from the control performed using engine output torque curve Lb to the control performed using engine output torque curve La.

Engine output torque curve Lb is typically set such that the inclination of a line segment connecting maximum torque point Jb and maximum horsepower point Kb is equal in value to the inclination of a line segment connecting maximum torque point Ja and maximum horsepower point Ka on engine output torque curve La.

Furthermore, the position of engine output torque curve Lb to be set is not particularly limited. Specifically, the torque difference between (i) the line connecting maximum torque point Jb and maximum horsepower point Kb and (ii) the line connecting maximum torque point Ja and maximum horsepower point Ka is not particularly limited. More specifically, if the line connecting maximum torque point Jb and maximum horsepower point Kb is lower in torque than the line connecting the maximum torque point and the maximum horsepower point on the engine output torque curve (for example, an engine output torque curve Lz in FIG. 6) on which the maximum torque and the maximum horsepower can be output at the set value of the throttle dial obtained when engine output torque curve La is set, the set position of engine output torque curve Lb is not particularly limited.

In addition, engine output torque curve La is an example of the "first engine output torque curve" of the present invention. Furthermore, engine output torque curve Lb and engine output torque curve Lc described later each are an example of the "second engine output torque curve" of the present invention.

(d2. Details of Control)

The outline of the engine output control has been described with reference to FIG. 4. In the following, the details of the engine output control performed in work vehicle 101 will be described with reference to FIGS. 5 and 6. Specifically, the control performed using an equivalent horsepower curve will be described. More specifically, an example of a method of setting a new engine output torque curve will be described.

Main controller 50 obtains a value of the throttle dial set by the operator (which will be hereinafter referred to as a "set value"). When the operator operates a control lever, main controller 50 obtains an engine output torque curve to be used from among a plurality of engine output torque curves based on the set value of the throttle dial and the operation details. Specifically, in main controller 50, the engine output control unit reads the engine output torque curve to be used from the memory (specifically, a memory 55 (see FIG. 7) described later).

For convenience of explanation, the following description will be given assuming that main controller 50 obtains engine output torque curve La shown in FIG. 4 from among a plurality of engine output torque curves based on the value of the throttle dial and the operation details.

Figure 5:
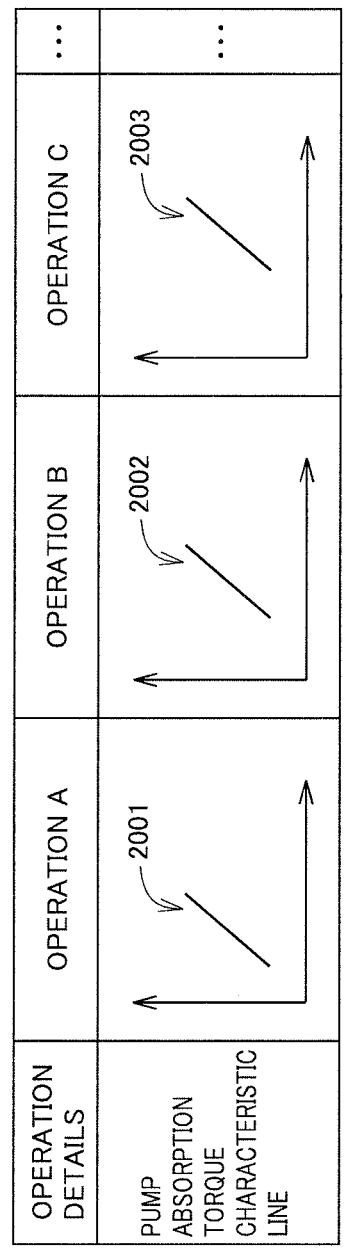
FIG. 5 is a diagram for illustrating a plurality of pump absorption torque characteristic lines stored in a main controller.

FIG. 5 is a diagram for illustrating a plurality of pump absorption torque characteristic lines stored in main controller 50. As shown in FIG. 5, main controller 50 stores a pump absorption torque characteristic line for each operation details for work implement levers 18 and 19. For example, pump absorption torque characteristic lines 2001, 2002, 2003, . . . are defined for operations A, B, C, . . . , respectively. In addition, it can be said that main controller 50 has a pump absorption torque characteristic line for each work for performing the work corresponding to the operation for each of work implement levers 18 and 19.

An operation A is for performing boom raising or arm excavation, for example. An operation B is for performing arm dumping, for example. An operation C is for performing revolving movements, for example.

When an operator operates work implement levers 18 and 19, main controller 50 obtains a pump absorption torque characteristic line to be used based on the operation details from among the plurality of engine output torque curves 2001, 2002, 2003 and the like. Specifically, in main controller 50, the engine output control unit reads a pump absorption torque characteristic line to be used from the memory.

For convenience of explanation, the following description will be given assuming that main controller 50 obtains a pump absorption torque characteristic line P shown in FIG. 4 based on the operation details from among the plurality of pump absorption torque characteristic lines.

Figure 6:
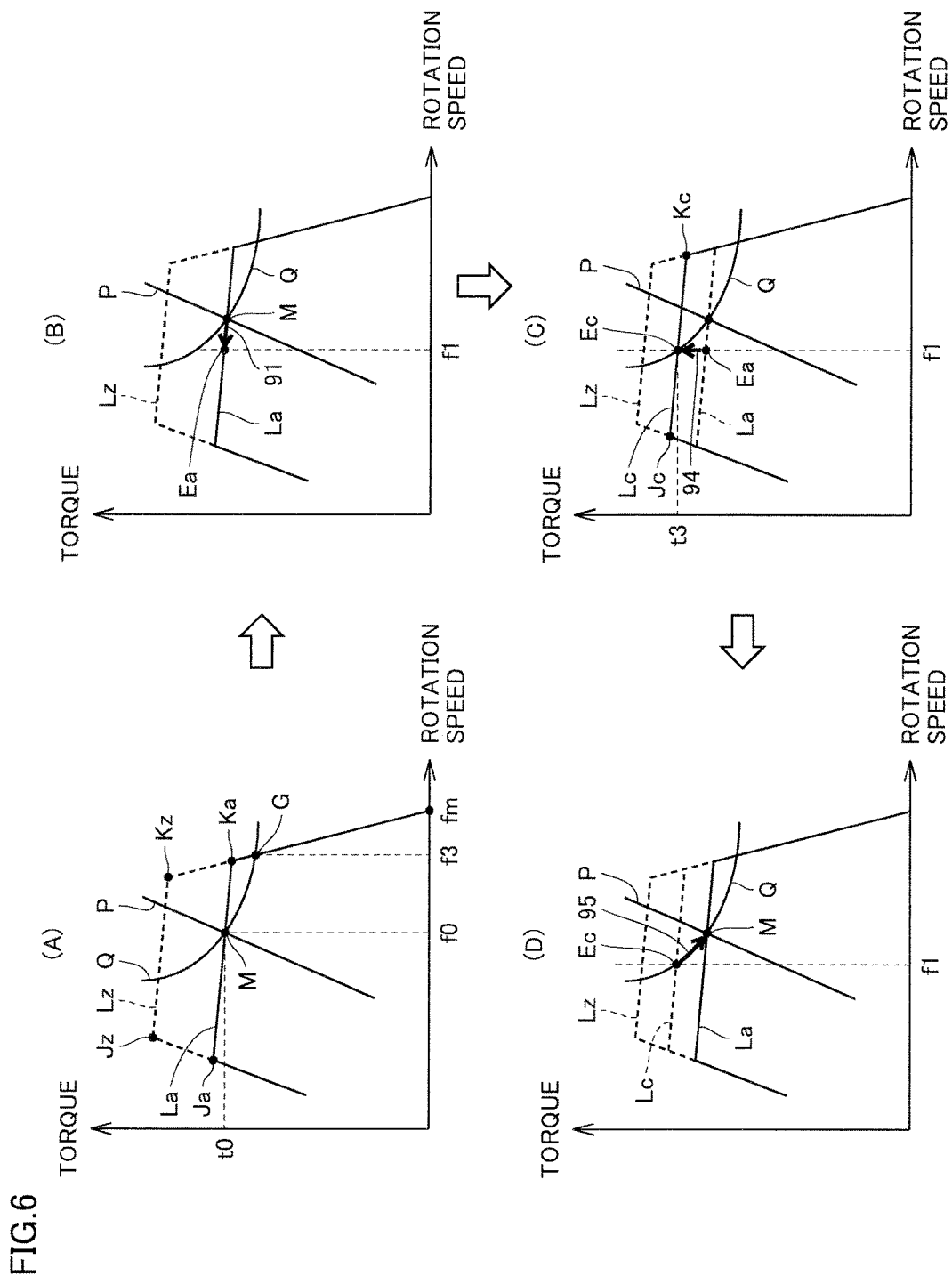
FIG. 6 is a diagram for illustrating details of control for the engine output.

FIG. 6 is a diagram for illustrating details of control for the engine output. Specifically, FIG. 6 is a diagram for illustrating the details of the process performed in main controller 50.

As shown in the state (A) in FIG. 6, main controller 50 (specifically, engine output control unit 54 (see FIG. 7) described later) performs engine rotation speed sensing control performed using engine output torque curve La and pump absorption torque characteristic line P.

Engine output torque curve Lz shown in FIG. 6 represents an engine output torque curve on which the highest torque and the highest horsepower can be output at the set value of the throttle dial. Engine output torque curve La is set by way of example such that the inclination of a line segment connecting maximum torque point Ja and maximum horsepower point Ka is equal in value to the inclination of a line segment connecting maximum torque point Jz and maximum horsepower point Kz on engine output torque curve Lz.

Main controller 50 sets an equivalent horsepower curve Q that passes through target matching point M. Equivalent horsepower curve Q intersects with engine output torque curve La at a point G. Rotation speed f3 of the engine at point G is higher than target rotation speed f0, and lower than no-load maximum rotation speed fm. The output horsepower and the output torque at point G are smaller than the output horsepower and the output torque, respectively, at maximum horsepower point Ka.

In the case where a large work load occurs in work vehicle 101 in the state where equivalent horsepower curve Q is set, when the engine rotation speed decreases to rotation speed f1 (see an arrow 91) as shown in the state (B) in FIG. 6, main controller 50 sets engine output torque curve Lc so as to: have maximum torque point Jc and maximum horsepower point Kc; and have torque larger than engine output torque curve La between maximum torque point Jc and maximum horsepower point Kc, as shown in the state (C) in FIG. 6. Specifically, main controller 50 sets engine output torque curve Lc on the condition that the rotation speed of engine 36 detected by rotation sensor 40 becomes lower than target rotation speed f0. More specifically, main controller 50 sets the engine output torque curve intersecting with equivalent horsepower curve Q at rotation speed f1 as engine output torque curve Lc. In addition, main controller 50 may be configured to set engine output torque curve Lc on the condition that the rotation speed of engine 36 detected by rotation sensor 40 becomes smaller than target rotation speed f0 by a threshold value or more.

Similarly to engine output torque curve Lb (see FIG. 4), engine output torque curve Lc is typically set such that the inclination of a line segment connecting maximum torque point Jc and maximum horsepower point Kc is equal in value to the inclination of a line segment connecting maximum torque point Ja and maximum horsepower point Ka on engine output torque curve La.

In this case, by control performed by main controller 50, the torque to be output can be raised from t0 to t3 (see an arrow 94) as shown in the states (A) to (C). Therefore, the force acting to reset the rotation speed of engine 36 back to target rotation speed f0 at target matching point M is larger than that in the case where the torque to be output is not changed from t1 to t3.

After torque t3 is output, main controller 50 uses equivalent horsepower curve Q in order to automatically reset the rotation speed of engine 36 back to target rotation speed f0. Specifically, main controller 50 sets the rotation speed of engine 36 close to target rotation speed f0 by using equivalent horsepower curve Q. More specifically, main controller 50 causes the rotation speed and the output torque of engine 36 to shift on equivalent horsepower curve Q, and rests the rotation speed and the output torque of engine 36 back to target rotation speed f0 and torque t0, respectively, at target matching point M.

Accordingly, as shown in the state (D) in FIG. 6, main controller 50 can raise the rotation speed of engine 36 from rotation speed f1 to target rotation speed f0 (see an arrow 95).

Particularly, because the rotation speed of engine 36 is reset back to target rotation speed 10 by using equivalent horsepower curve Q, main controller 50 allows engine 36 to output equivalent horsepower during this resetting process. Thus, the above-described configuration not only can prevent the rotation speed of engine 36 from decreasing, but also can improve the operativity of the operator as compared with the configuration in which the output horsepower is changed during resetting.

As described above, in work vehicle 101, the control for sequentially switching the engine output torque curve to be used (dynamic torque control) is performed even after the set value of throttle dial 39 is set and the operations for work implement levers 18 and 19 are specified. Engine output torque curve La, engine output torque curve Lc, engine output torque curve Lb described with reference to FIG. 4, and engine output torque curve Lz each are also referred to as a "dynamic torque line".

<E. Functional Configuration>

Figure 7:
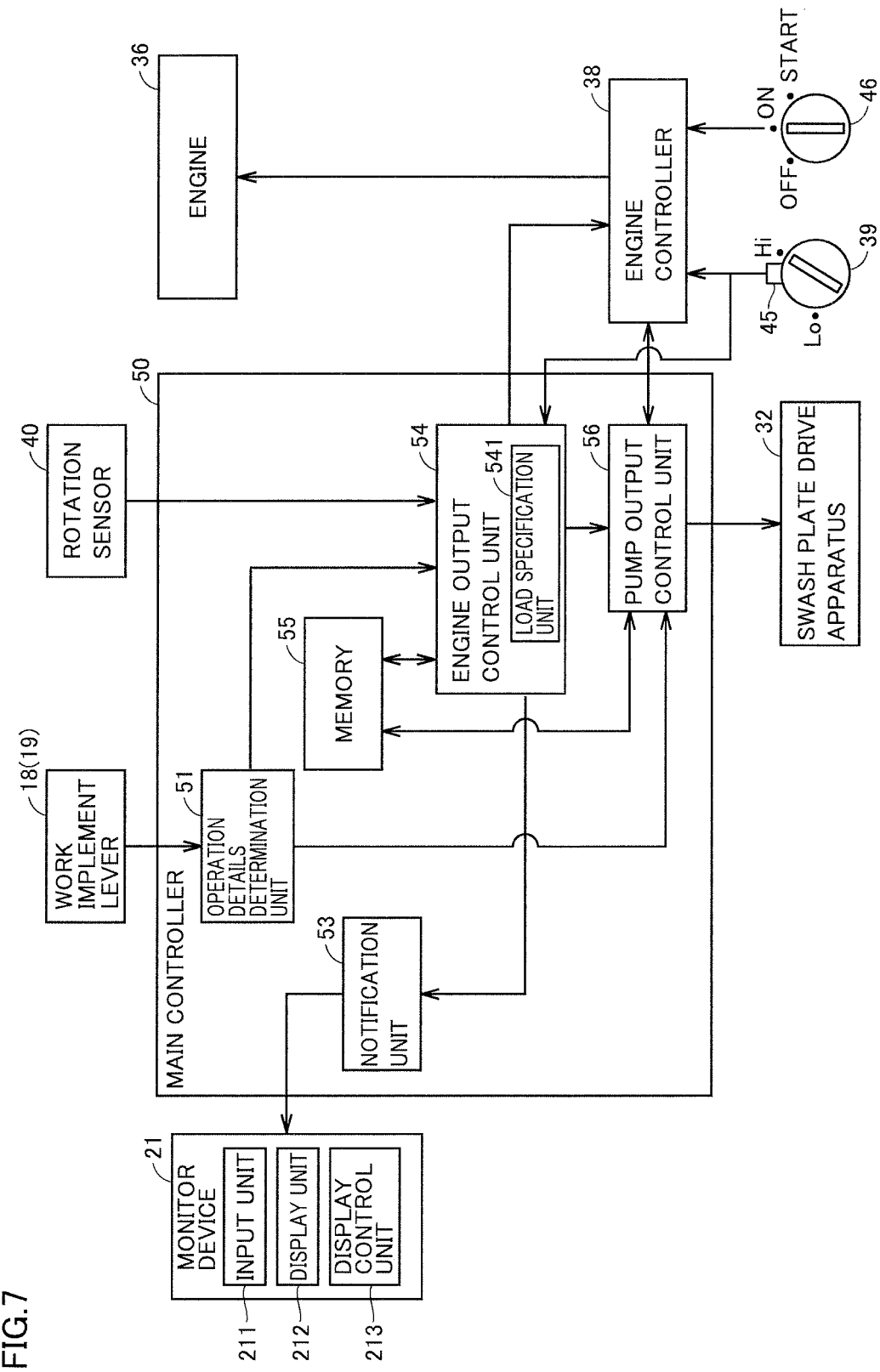
FIG. 7 is a functional block diagram illustrating the main controller in the control system of the work vehicle.

FIG. 7 is a functional block diagram illustrating main controller 50 in the control system of work vehicle 101. For convenience of explanation, in the following description with regard to FIG. 7, engine output torque curve Lc shown in FIG. 6 will be described as an example of an engine output torque curve that is to be newly set.

As shown in FIG. 7, the relation between main controller 50 and other peripheral devices is shown. The figure shows, as peripheral devices, work implement levers 18, 19, monitor device 21, engine 36, engine controller 38, throttle dial 39, potentiometer 45, starter switch 46, and rotation sensor 40.

Main controller 50 includes an operation details determination unit 51, a notification unit 53, a memory 55, an engine output control unit 54, and a pump output control unit 56. Engine output control unit 54 has a load specification unit 541. Load specification unit 541 will be explained in a modification ("<G. Modification>"), which will be described later.

Notification unit 53 instructs monitor device 21 to give a notification about guidance information in response to the instruction from engine output control unit 54. Monitor device 21 includes an input unit 211, a display unit 212, and a display control unit 213. Display control unit 213 of monitor device 21 causes display unit 212 to display prescribed guidance information in response to the instruction from notification unit 53.

Operation details determination unit 51 determines the operation details for work implement levers 18 and 19 performed by an operator. For example, operation details determination unit 51 determines as to which operation among the above-described plurality of operations A, B, C, . . . the work based on the operation by an operator corresponds. Operation details determination unit 51 outputs the determination result to engine output control unit 54.

Memory 55 stores various pieces of information about the engine output torque control and the pump absorption torque control. Specifically, memory 55 stores information about the engine output torque curve and the pump absorption torque characteristic line. More specifically, memory 55 stores a plurality of engine output torque curves in association with the value of the throttle dial and the operation details. As shown in FIG. 5, memory 55 stores a plurality of pump absorption torque characteristic lines in association with the operation details.

Engine output control unit 54 receives an input of the determination result of the operation details from operation details determination unit 51. Furthermore, engine output control unit 54 accepts the information about the set value of throttle dial 39 from potentiometer 45. Based on the above-described determination result and the information about the above-described set value, engine output control unit 54 obtains an engine output torque curve to be used, from among the plurality of engine output torque curves stored in memory 55.

As described above, engine output control unit 54 sets the target rotation speed of engine 36 by using engine output torque curve La, to control the output of engine 36. Specifically, engine output control unit 54 instructs engine controller 38 to control engine 36 in accordance with the obtained engine output torque curve.

Engine controller 38 controls engine 36 in accordance with the engine output torque curve set by engine output control unit 54. Thereby, the torque that is set based on the rotation speed of engine 36 is output from engine 36 in accordance with the characteristics of the set engine output torque curve.

Pump output control unit 56 accepts the determination result of the operation details from operation details determination unit 51, and obtains a pump absorption torque characteristic line corresponding to the above-described determination result from among the plurality of pump absorption torque characteristic lines stored in memory 55.

Pump output control unit 56 controls a hydraulic pump (for example, first hydraulic pump 31A) in accordance with the obtained pump absorption torque characteristic line. Specifically, pump output control unit 56 controls a swash plate of the hydraulic pump (for example, first hydraulic pump 31A) in accordance with the engine rotation speed input from engine controller 38 in accordance with the pump absorption torque characteristic line set in accordance with the operation details.

Furthermore, pump output control unit 56 calculates a maximum absorption torque value at target matching point M corresponding to the intersection point of the obtained pump absorption torque characteristic line and the engine output torque curve output from engine output control unit 54. Thereby, pump output control unit 56 controls the swash plate of the hydraulic pump such that the torque value in the hydraulic pump (for example, first hydraulic pump 31A) does not exceed the maximum absorption torque value.

Furthermore, engine output control unit 54 obtains the information about the rotation speed (actual rotation speed) of engine 36 from rotation sensor 40. Engine output control unit 54 performs output control while (i) setting, as a target rotation speed, the rotation speed of engine 36 at an intersection point (target matching point M in FIG. 6) of the engine output torque curve obtained from memory 55 (hereinafter referred to as an "engine output torque curve La" for convenience of explanation) and the pump absorption torque characteristic line of the hydraulic pump (hereinafter referred to as a "pump absorption torque characteristic line P" for convenience of explanation), and (ii) setting the torque of the engine at the above-mentioned intersection point as a target torque.

When the engine rotation speed (actual rotation speed) detected by rotation sensor 40 becomes lower than target rotation speed f0, engine output control unit 54 sets engine output torque curve Lc that is greater in torque at the actual rotation speed than engine output torque curve La. Specifically, engine output control unit 54 sets engine output torque curve Lc (see the state (C) in FIG. 6) that is greater in torque than engine output torque curve La between the maximum torque point and the maximum horsepower point.

When engine output control unit 54 sets engine output torque curve Lc, it temporarily switches the output control of engine 36 from the control performed using engine output torque curve La to the control performed using engine output torque curve Lc. Specifically, engine output control unit 54 controls engine 36 to temporarily output the torque on engine output torque curve Lc (torque t3 in the case of rotation speed f1) corresponding to the detected rotation speed (for example, rotation speed f1 in FIG. 6).

By the above-described control performed by engine output control unit 54, the rotation speed of engine 36 can be spontaneously reset to target rotation speed f0.

Accordingly, the rotation speed of engine 36 can be prevented from significantly decreasing.

<F. Control Structure>

Figure 8:
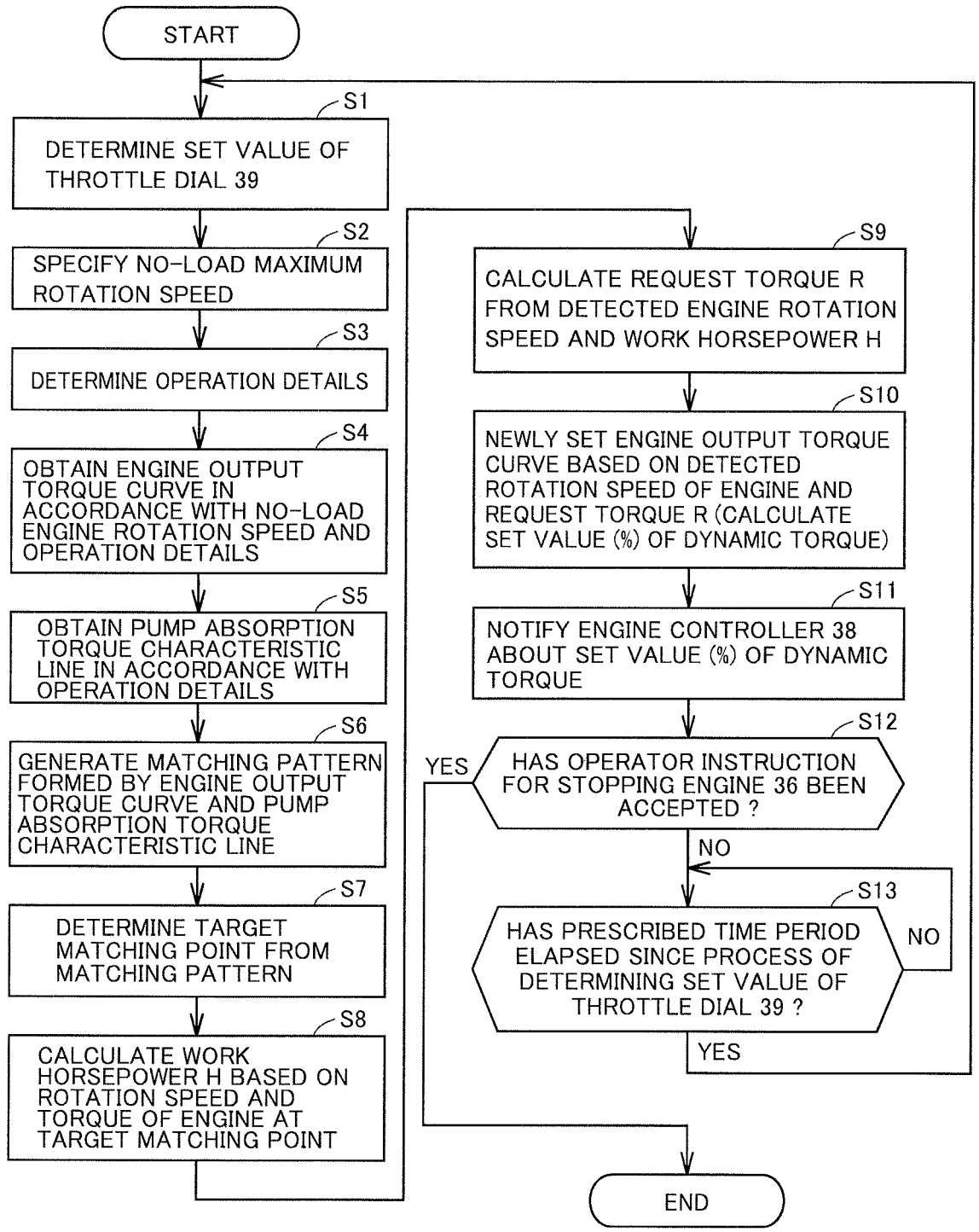
FIG. 8 is a flowchart illustrating a flow of a process in the main controller.

FIG. 8 is a flowchart illustrating a flow of the process in main controller 50. Specifically, the following is an explanation about the configuration in which the engine output torque curve to be used (for example, engine output torque curve La) is determined from among a plurality of engine output torque curves, based on the information about the no-load maximum rotation speed uniquely determined in accordance with the set value of throttle dial 39.

In step S1, engine output control unit 54 determines a set value of throttle dial 39 set by the operator. In step S2, engine output control unit 54 specifies the no-load maximum rotation speed based on the set value of the throttle dial. In step S3, operation details determination unit 51 determines the operation details for each of work implement levers 18 and 19. Specifically, operation details determination unit 51 determines as to which operation among the plurality of operations A, B, C, . . . the accepted operation corresponds.

In step S4, engine output control unit 54 reads one engine output torque curve from memory 55 based on the no-load maximum rotation speed and the determination result achieved by operation details determination unit 51. In step S5, pump output control unit 56 reads one pump absorption torque characteristic line from memory 55 based on the determination result achieved by operation details determination unit 51.

In step S6, engine output control unit 54 generates a matching pattern formed by the engine output torque curve and the pump absorption torque characteristic line that have been read. Specifically, engine output control unit 54 treats, as data on the same coordinates, the engine output torque curve and the pump absorption torque characteristic line that have been read from memory 55. For example, engine output control unit 54 generates data obtained by combining engine output torque curve La and pump absorption torque characteristic line P as shown in the state (A) in FIG. 6.

In step S7, engine output control unit 54 determines a target matching point from the generated matching pattern. In step S8, engine output control unit 54 calculates a work horsepower H based on the rotation speed and the torque of engine 36 at the target matching point. Specifically, engine output control unit 54 calculates work horsepower H by multiplying the rotation speed by the torque.

In step S9, request torque R is calculated from work horsepower H and engine rotation speed f (for example, f1 in the case in FIG. 6) detected by rotation sensor 40. Specifically, the following equation (1) is calculated. By the process in step S9, a new engine output torque curve (for example, engine output torque curve Lc) is to be set.

$$R = H \times 4500/2/\pi/f \qquad (1)$$

In step S10, engine output control unit 54 newly sets an engine output torque curve based on the detected rotation speed of the engine and request torque R.

Specifically, engine output control unit 54 calculates a set value (%) of the dynamic torque. In step S11, engine output control unit 54 notifies engine controller 38 about the set value of the dynamic torque obtained by the calculation.

In step S12, main controller 50 determines whether the operator operation for stopping the engine has been accepted or not. If it is determined that the operator operation has been accepted (YES in step S12), main controller 50 ends a series of processes. If it is determined that the operator operation has not been accepted (NO in step S12), engine output control unit 54 determines in step S13 whether a prescribed time period has elapsed or not since the process of determining the set value of throttle dial 39 (process in step S1). Typically, engine output control unit 54 determines whether 10 msec has elapsed or not as a prescribed time period.

If it is determined that the prescribed time period has not elapsed (NO in step S13), engine output control unit 54 returns the process to step S13. If it is determined that the prescribed time period has elapsed (YES in step S13), engine output control unit 54 returns the process to step S1. In this way, main controller 50 repeats a series of processes (steps S1 to S13) in a prescribed control period (for example, 10 msec).

In addition, in place of step 4, engine output control unit 54 may obtain an engine output torque curve from the set value of throttle dial 39 and the operation details. In this case, the process in step S2 does not have to be performed.

<G. Modification>

(g1. First Modification)

In the case of work with light load, the horsepower at the maximum horsepower point (maximum horsepower) may not be required. Also, if the maximum horsepower is not output, the fuel efficiency is improved. Thus, the configuration for performing different controls in accordance with the operation details will be hereinafter described. Specifically, the configuration utilizing a load specification unit 541 (FIG. 7) will be described. For convenience of explanation, the following description will be given assuming that engine output control unit 54 selects engine output torque curve La.

Work implement levers 18 and 19 accept at least the first operation (for example, operation C) and the second operation (for example, operation A). Work vehicle 101 performs the first work (for example, revolution) when work implement levers 18 and 19 accept the first operation. When work implement levers 18 and 19 accept the second operation, the work vehicle performs the second work (for example, boom raising) that is greater in load than the first work. The details of the process of load specification unit 541 in work vehicle 101 having such a configuration will be hereinafter described.

Load specification unit 541 receives a determination result from operation details determination unit 51. Based on the determination result, load specification unit 541 specifies the load for the work to be performed by work vehicle 101. For example, if operation details determination unit 51 determines that work implement levers 18 and 19 have accepted the first operation, load specification unit 541 specifies the load for the work as the first load. If operation details determination unit 51 determines that work implement levers 18 and 19 have accepted the second operation, load specification unit 541 specifies the load for the work as the second load.

Engine output control unit 54 performs different controls in accordance with the cases where the first load is specified and where the second load is specified, as described below.

Figure 9:
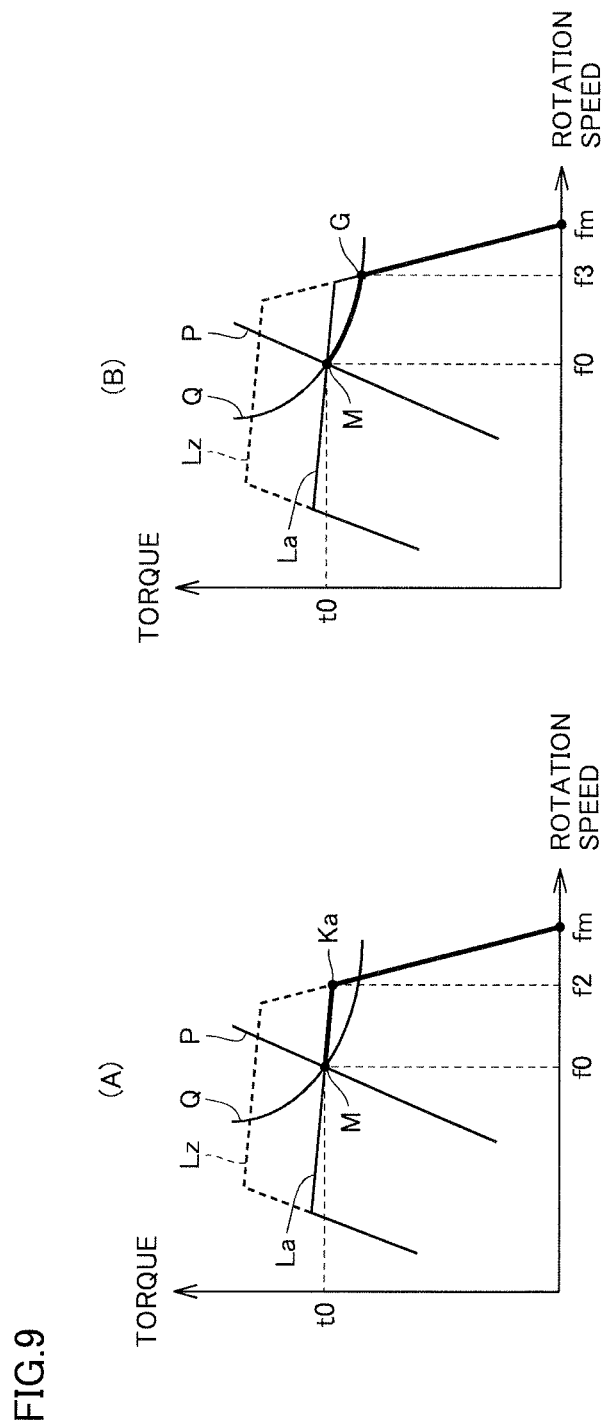
FIG. 9 is a diagram for illustrating lines used by an engine output control unit in a range from a target rotation speed to a no-load maximum rotation speed.

FIG. 9 is a diagram for illustrating lines used by engine output control unit 54 in a range from target rotation speed f0 to no-load maximum rotation speed fm (specifically, lines defining the engine rotation speed and the torque). FIG. 9(A) is a diagram for illustrating a line used by engine output control unit 54 when work vehicle 101 performs work with heavy load (for example, the work performed based on operation A). FIG. 9(B) is a diagram for illustrating a line used by engine output control unit 54 when work vehicle 101 performs work with light load (for example, the work performed based on operation B or operation C).

As shown in FIG. 9(A), when the work with heavy load is performed (in the case of the second load), engine output control unit 54 performs output control in line with engine output torque curve La in a range from target rotation speed f0 to no-load maximum rotation speed fm. Specifically, engine output control unit 54 performs output control performed using maximum horsepower point Ka on engine output torque curve La. Such control allows engine 36 to produce the maximum horsepower, so that the workability can be improved.

As shown in FIG. 9(B), when the work with light load is performed (in the case of the first load), engine output control unit 54 performs output control in line with equivalent horsepower curve Q in a range from target rotation speed f0 to rotation speed f3 at point G. In addition, engine output control unit 54 performs output control in line with engine output torque curve La in a range from rotation speed f3 to no-load maximum rotation speed fm. By such control, engine 36 does not have to produce the maximum horsepower on engine output torque curve La, so that the fuel efficiency can be improved.

Figure 10:
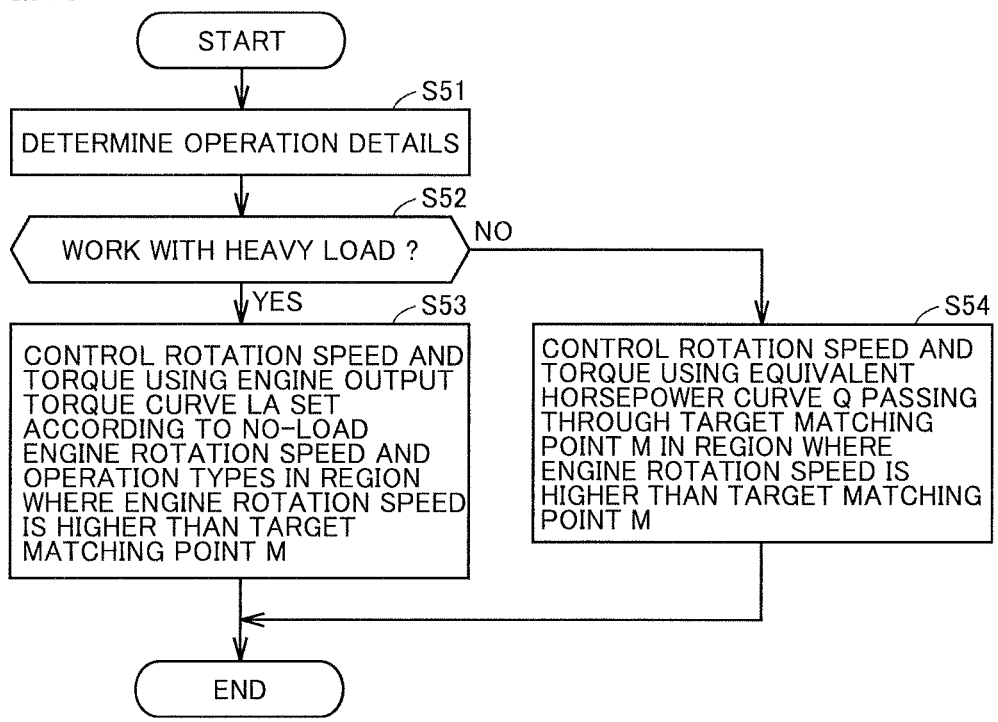
FIG. 10 is a flowchart for illustrating a flow of output control shown in FIG. 9.

FIG. 10 is a flowchart for illustrating a flow of the output control shown in each of FIGS. 9(A) and 9(B). As shown in FIG. 10, in step S51, operation details determination unit 51 determines the operation details for work implement levers 18 and 19. In step S52, engine output control unit 54 determines whether the work of the determined operation details is a work with heavy load or not. Specifically, engine output control unit 54 determines whether the determined operation details correspond to the operation details classified as work with heavy load (for example, operation A) or not. It is to be noted that such classification is made in advance by main controller 50.

If it is determined that the determined operation details represent work with heavy load (YES in step S52), then in step S53, engine output control unit 54 controls the rotation speed and the torque of engine 36 by using engine output torque curve La set according to the no-load maximum rotation speed and the operation details, in a region where the rotation speed of the engine is higher than target matching point M.

If it is determined that the determined operation details do not represent work with heavy load (NO in step S52), then in step S54, engine output control unit 54 controls the rotation speed and the torque of engine 36 by using equivalent horsepower curve Q passing through target matching point M in a region where the rotation speed of engine 36 is higher than target matching point M. Specifically, engine output control unit 54 performs output control in line with equivalent horsepower curve Q in a range from target rotation speed f0 to rotation speed f3 at point G.

As described above, work vehicle 101 includes load specification unit 541 configured to specify the load for the work performed by work vehicle 101. When the load specified by load specification unit 541 is the second load greater than the first load, and when the actual rotation speed is higher than target rotation speed f0, engine output control unit 54 controls the output of engine 36 such that the actual rotation speed and the torque change on engine output torque curve La. According to this configuration, when the work with the second load greater in load than the work with the first load is performed, work vehicle 101 can use maximum horsepower point Ka on engine output torque curve La. Therefore, the workability can be improved.

Furthermore, when the specified load is the first load, and when the actual rotation speed is higher than target rotation speed f0, engine output control unit 54 controls the output of engine 36 such that the actual rotation speed and the torque change on equivalent horsepower curve Q passing through target matching point M. According to this configuration, when the work with the first load that is smaller in load than the work with the second load is performed, equivalent horsepower curve Q passing through target matching point M can be used. In this case, the horsepower at intersection point G of equivalent horsepower curve Q and the droop line of engine output torque curve La (the line connecting maximum horsepower point Ka and the point of the maximum rotation speed of the engine) is smaller than maximum horsepower point Ka on engine output torque curve La. Therefore, it becomes possible for work vehicle 101 to decrease the fuel consumption as compared with the case where maximum horsepower point Ka is used.

Furthermore, load specification unit 541 specifies the load for the work as the first load when work implement levers 18 and 19 accept the first operation; and specifies the load for the work as the second load when work implement levers 18 and 19 accept the second operation. According to this configuration, work vehicle 101 can specify the load for the work as one of the first load and the second load depending on whether work implement levers 18 and 19 have accepted the first operation or the second operation.

(g2. Second Modification)

In the above-described first modification, load specification unit 541 specifies a load in accordance with the operation details of work implement levers 18 and 19. However, the method of specifying a load is not limited to the above. Load specification unit 541 may specify a load in accordance with the hydraulic pressure of the hydraulic oil.

For example, load specification unit 541 can be configured such that: (i) the load for the work is specified as the first load when the pressure of the hydraulic oil output by first hydraulic pump 31A is less than a predetermined threshold value; and (ii) the load for the work is specified as the second load when the pressure of the hydraulic oil output by first hydraulic pump 31A is equal to or greater than the predetermined threshold value.

Alternatively, the pressure of the hydraulic oil inside hydraulic actuator 35 may be detected and compared with the predetermined threshold value, thereby specifying a load.

(g3. Third Modification)

In the embodiment, an explanation has been given with regard to an example of the configuration in which, on the condition that the rotation speed detected by rotation sensor 40 becomes lower than the target rotation speed, engine output control unit 54 newly sets an engine output torque curve (for example, engine output torque curves Lb, Lc) that is higher in torque than the currently used engine output torque curve (for example, engine output torque curve La). However, the present invention is not limited to the above, but engine output control unit 54 may be configured to newly set an engine output torque curve that is higher in torque than the currently used engine output torque curve before the rotation speed detected by rotation sensor 40 becomes lower than target rotation speed f0.

Specifically, based on the detected rotation speed (actual rotation speed), engine output control unit 54 predicts whether the rotation speed of engine 36 becomes lower than target rotation speed f0 or not. Typically, engine output control unit 54 determines the decrease amount per unit time of the engine rotation speed, and then, predicts whether the rotation speed of engine 36 becomes lower than target rotation speed f0 or not in the next control period. On the condition that it is predicted that the rotation speed of engine 36 becomes lower than the target rotation speed, engine output control unit 54 newly sets an engine output torque curve that is higher in torque than the currently used engine output torque curve.

According to the above-described configuration, a new engine output torque curve can be set before the rotation speed of engine 36 becomes lower than target rotation speed f0. Therefore, the rotation speed of engine 36 can be rapidly brought close to the target rotation speed as compared with the configuration in which a new engine output torque curve is set after the rotation speed of engine 36 becomes lower than target rotation speed f0.

(g4. Fourth Modification)

In the embodiment, request torque R is calculated from work horsepower H as shown in the equation (1), but the present invention is not limited thereto. Engine output control unit 54 may be configured such that request torque R is calculated in consideration of fan horsepower H1 and horsepower H2 that is required for operating auxiliary machinery (for example, an alternator, an air-conditioner). Specifically, request torque R may be obtained by calculating the following equation (2).

$$R=(H+H1+H2)\times 4500/2/\pi/f \qquad (2)$$

In addition, at least two of the above-described plurality of modifications (the first modification, the second modification, the third modification, and the fourth modification) may be combined as appropriate with the configuration of work vehicle 101 in the embodiment.

(g5. Fifth Modification)

In the above-described embodiment, for example, as shown in FIG. 6, when the actual rotation speed detected by rotation sensor 40 becomes lower than the target rotation speed, engine output control unit 54 sets engine output torque curve Lc (second engine output torque curve) that is greater in torque at the actual rotation speed than engine output torque curve La (first engine output torque curve). Then, engine output control unit 54 switches the output control of the engine from the control performed using engine output torque curve La to the control performed using engine output torque curve Lc.

However, engine output control unit 54 does not necessarily have to set engine output torque curve Lc. Engine output control unit 54 may increase an engine torque using equivalent horsepower curve Q (see FIG. 6) passing through target matching point M. Specifically, engine output control unit 54 may be configured to control the output of the engine so as to set torque to be higher than the torque at the actual rotation speed obtained using engine output torque curve La.

Even in such a configuration, it becomes possible to temporarily output torque greater than the torque defined by engine output torque curve La. Accordingly, the force acting to reset the engine rotation speed back to a target rotation speed is greater than that in the case where engine output torque curve La is used. Therefore, according to work vehicle 101, the engine rotation speed can be prevented from significantly decreasing even in the case where the maximum horsepower is set to be increased.

The embodiments disclosed herein are by way of example, but not limited only to the above-described description. The scope of the present invention is defined by the terms of the claims, and is intended to include any modifications within the meaning and scope equivalent to the terms of the claims.

REFERENCE SIGNS LIST 1 traveling unit, 3 revolving unit, 4 work implement, 5 boom, 6 arm, 7 bucket, 8 operator's compartment, 9 operator's seat, 10 travel operation unit, 11, 12 travel lever, 13, 14 travel pedal, 15 pedal for attachment, 16 side window, 17 dashboard, 18, 19 work implement lever, 20 lock lever, 21 monitor device, 22 front window, 23 vertical frame, 31A first hydraulic pump, 31B second hydraulic pump, 32 swash plate drive apparatus, 34 control valve, 35 hydraulic actuator, 36 engine, 38 engine controller, 39 throttle dial, 40 rotation sensor, 41 work implement lever apparatus, 42 pressure switch, 43 valve, 45 potentiometer, 46 starter switch, 50 main controller, 51 operation details determination unit, 54 engine output control unit, 55 memory, 56 pump output control unit, 101 work vehicle, 501, 502, 503, 751, La, Lb, Lz engine output torque curve, 2001, 2002, 2003, P pump absorption torque characteristic line, Ea, Eb output point, Ja, Jb, Jz maximum torque point, Ka, Kb, Kz maximum horsepower point, M target matching point, Q equivalent horsepower curve, f0 target rotation speed, fm no-load maximum rotation speed.

The invention claimed is:

1. A work vehicle comprising:
an engine;
a work implement;
a hydraulic actuator configured to drive the work implement;
a hydraulic pump configured to supply hydraulic oil to the hydraulic actuator by driving the engine;
a sensor configured to detect an actual rotation speed of the engine; and
a controller configured to control an output of the engine, wherein the controller includes a memory configured to store
a first engine output torque curve defining a relation between a rotation speed of the engine and torque of the engine, and
a pump absorption torque characteristic line of the hydraulic pump, and
the controller is configured to
set, as a target rotation speed, a value of the rotation speed of the engine at an intersection point of the first engine output torque curve and the pump absorption torque characteristic line, and control the output of the engine so as to set the actual rotation speed close to the target rotation speed,
based on the relation between the rotation speed of the engine and the torque of the engine in the first engine output torque curve, calculate the torque of the engine at the actual rotation speed, and
cause the engine to temporarily output, at the actual rotation speed, torque higher than the calculated torque of the engine on condition that the actual rotation speed becomes lower than the target rotation speed.

2. The work vehicle according to claim 1, wherein the memory of the controller is configured to store a second engine output curve defining a relation between the rotation speed of the engine and torque of the engine, the relation defined in the second engine output curve having a greater torque at the actual rotation speed than the relation defined in the first engine output curve,
the controller is configured to, when the actual rotation speed becomes lower than the target rotation speed, use the second engine output torque curve to cause the engine to temporarily output, at the actual rotation speed, torque higher than the calculated torque of the engine.

3. The work vehicle according to claim 2, wherein the controller is configured to
predict, based on the actual rotation speed, whether a rotation speed of the engine becomes lower than the target rotation speed, and
read out, from the memory, the second engine output torque curve on condition that it is predicted that the rotation speed of the engine becomes lower than the target rotation speed.

4. The work vehicle according to claim 2, wherein the controller is configured to:
based on an equivalent horsepower curve passing through the intersection point of the first engine output torque curve and the pump absorption torque characteristic line, set an engine output torque curve passing through a point on the equivalent horsepower curve at the actual rotation speed as the second engine output torque curve.

5. The work vehicle according to claim 4, wherein the controller is configured to control the output of the engine so as to set the actual rotation speed close to the target rotation speed by using the equivalent horsepower curve.

6. The work vehicle according to claim 4, wherein the controller is configured to
determine a load for work performed by the work vehicle, and
when the determined load is a first load, and when the actual rotation speed is higher than the target rotation speed,
control the output of the engine such that the actual rotation speed and the torque at the actual rotation speed change on the equivalent horsepower curve passing through the intersection point.

7. The work vehicle according to claim 6, wherein the controller is configured to,
when the determined load is a second load greater than the first load, and
when the actual rotation speed is higher than the target rotation speed,
control the output of the engine such that the actual rotation speed and the torque change on the first engine output torque curve.

8. The work vehicle according to claim 6, further comprising a control lever, wherein
the controller is configured to
determine the load for the work as the first load when the control lever accepts a first operation, and
determine the load for the work as the second load when the control lever accepts a second operation different from the first operation.

9. The work vehicle according to claim 6, wherein
the controller is configured to
determine the load for the work as the first load when a hydraulic pressure of the hydraulic oil is a first value, and
determine the load for the work as the second load when the hydraulic pressure of the hydraulic oil is a second value greater than the first value.

10. A method of controlling an engine output in a work vehicle including an engine, a work implement, a hydraulic actuator configured to drive the work implement, and a hydraulic pump configured to supply hydraulic oil to the hydraulic actuator by driving the engine, the method comprising:
detecting an actual rotation speed of the engine;
setting a target rotation speed of the engine using (i) a predetermined engine output torque curve defining a relation between a rotation speed of the engine and torque of the engine and (ii) a pump absorption torque characteristic line of the hydraulic pump, wherein the target rotation speed is set as a value of the rotation speed of the engine at an intersection point of the predetermined engine output torque curve and the pump absorption torque characteristic line;

controlling an output of the engine so as to set the actual rotation speed close to the target rotation speed;

based on the relation between the rotation speed of the engine and the torque of the engine in the predetermined engine output torque curve, calculating the torque of the engine at the actual rotation speed; and causing the engine to temporarily output, at the actual rotation speed, torque higher than the calculated torque of the engine on condition that the actual rotation speed becomes lower than the target rotation speed.

\* \* \* \* \*